(12) United States Patent
Griffin et al.

(10) Patent No.: US 11,487,575 B2
(45) Date of Patent: Nov. 1, 2022

(54) ENABLING RESTORATION OF QUBITS FOLLOWING QUANTUM PROCESS TERMINATION

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

(*) Notice: Subject to any disclaimer, the term of this patent is extended or adjusted under 35 U.S.C. 154(b) by 65 days.

(21) Appl. No.: 17/184,771

(22) Filed: Feb. 25, 2021

(65) Prior Publication Data

US 2022/0269526 A1 Aug. 25, 2022

(51) Int. Cl.
*G06F 9/46* (2006.01)
*G06F 9/48* (2006.01)
*G06F 9/50* (2006.01)
*G06N 10/00* (2022.01)

(52) U.S. Cl.
CPC ............ *G06F 9/485* (2013.01); *G06F 9/5022* (2013.01); *G06F 9/5077* (2013.01); *G06N 10/00* (2019.01)

(58) Field of Classification Search
CPC ...... G06F 9/485; G06F 9/5022; G06F 9/5077; G06N 10/00
See application file for complete search history.

(56) References Cited

U.S. PATENT DOCUMENTS

| | | |
|---|---|---|
| 9,007,088 B2 | 4/2015 | Liao et al. |
| 9,286,154 B2 | 3/2016 | Ashikhmin |
| 2018/0157986 A1 | 6/2018 | Oxford et al. |
| 2020/0160204 A1 | 5/2020 | Johnson et al. |

FOREIGN PATENT DOCUMENTS

JP 4552577 B2 9/2010

OTHER PUBLICATIONS

Guan, Si-Yu, et al., "Restoration of Three-Qubit Entanglements and Protection of Tripartite Quantum State Sharing Over Noisy Channels via Environment-Assisted Measurement and Reversal Weak Measurement," Quantum Information Processing, vol. 16, Issue 5, article id.137, 2017, 15 pages, accessible online at https://link.springer.com/article/10.1007/s11128-017-1584-0.

(Continued)

*Primary Examiner* — Gregory A Kessler
(74) *Attorney, Agent, or Firm* — Dority & Manning, P.A.

(57) ABSTRACT

Enabling restoration of qubits following quantum process termination is disclosed. In one example, a quantum restore service, executing on a processor device of a quantum computing device, detects an exit request corresponding to a quantum process associated with one or more qubits. The quantum restore service obtains metadata, including an identification of the quantum process (such as a quantum process identifier (ID), a quantum process name, and/or a Quantum Assembly Language (QASM) file descriptor) and an identification of each qubit. The quantum restore service then maintains the qubits in association with the identification of the quantum process based on the metadata after termination of the quantum process. In some examples, the quantum restore service may allocate a logical partition, associate the logical partition with the quantum process, and then associate the qubits with the logical partition. In this manner, the qubits may be preserved after the quantum process has terminated.

20 Claims, 6 Drawing Sheets

(56) References Cited

OTHER PUBLICATIONS

Mičuda, M., et al., "Experimental Test of Robust Quantum Detection and Restoration of a Qubit," Physical Review A, vol. 92, 012324, 2015, 5 pages, accessible online at htttps://www.researchgate.net/publication/280600376_Experimental_test_of_robust_quantum_detection_and_restoration_of_a_qubit.
Zhao, Xinyu, et al., "Restoration of Quantum State in Dephasing Channel," Physical Review A, vol. 88, 022321, 2013, 8 pages, accessible online at https://arxiv.org/abs/1305.4627.

ENABLING RESTORATION OF QUBITS FOLLOWING QUANTUM PROCESS TERMINATION

BACKGROUND

Quantum computing involves the use of quantum bits, referred to herein as "qubits," each of which has properties (such as superposition and entanglement) that differ from those of non-quantum bits used in classical computing. As quantum computing continues to increase in popularity and become more commonplace, an ability to manage the use of qubits by quantum processes that may be subject to unexpected or accidental termination will be desirable.

SUMMARY

The examples disclosed herein implement a quantum restoration mechanism that enables restoration of qubits following quantum process termination by detecting an exit request for a quantum process, and then maintaining any qubits that are associated with that quantum process after the quantum process terminates. In this manner, if the quantum process is subsequently re-started (e.g., within a predetermined time interval), the qubits may be re-associated with the restarted quantum process, thus preserving data continuity.

In one example, a method for enabling restoration of qubits following quantum process termination is disclosed. The method comprises detecting, by a quantum restore service of a quantum computing device, an exit request corresponding to a quantum process associated with one or more qubits. The method further comprises obtaining metadata corresponding to the quantum process, wherein the metadata comprises an identification of the quantum process and an identification of each of the one or more qubits. The method also comprises maintaining, by the quantum restore service, the one or more qubits in association with the identification of the quantum process based on the metadata after termination of the quantum process.

In another example, a quantum computing device for enabling restoration of qubits following quantum process termination is disclosed. The quantum computing device comprises a system memory and a processor device coupled to the system memory. The processor device is to detect an exit request corresponding to a quantum process associated with one or more qubits. The processor device is further to obtain metadata corresponding to the quantum process, wherein the metadata comprises an identification of the quantum process and an identification of each of the one or more qubits. The processor device is also to maintain the one or more qubits in association with the identification of the quantum process based on the metadata after termination of the quantum process.

In another example, a computer program product is provided. The computer program product comprises a non-transitory computer-readable medium having stored thereon computer-executable instructions which, when executed, cause a processor device to detect an exit request corresponding to a quantum process associated with one or more qubits. The computer-executable instructions further cause the processor to obtain metadata corresponding to the quantum process, wherein the metadata comprises an identification of the quantum process and an identification of each of the one or more qubits. The computer-executable instructions also cause the processor to maintain the one or more qubits in association with the identification of the quantum process based on the metadata after termination of the quantum process.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
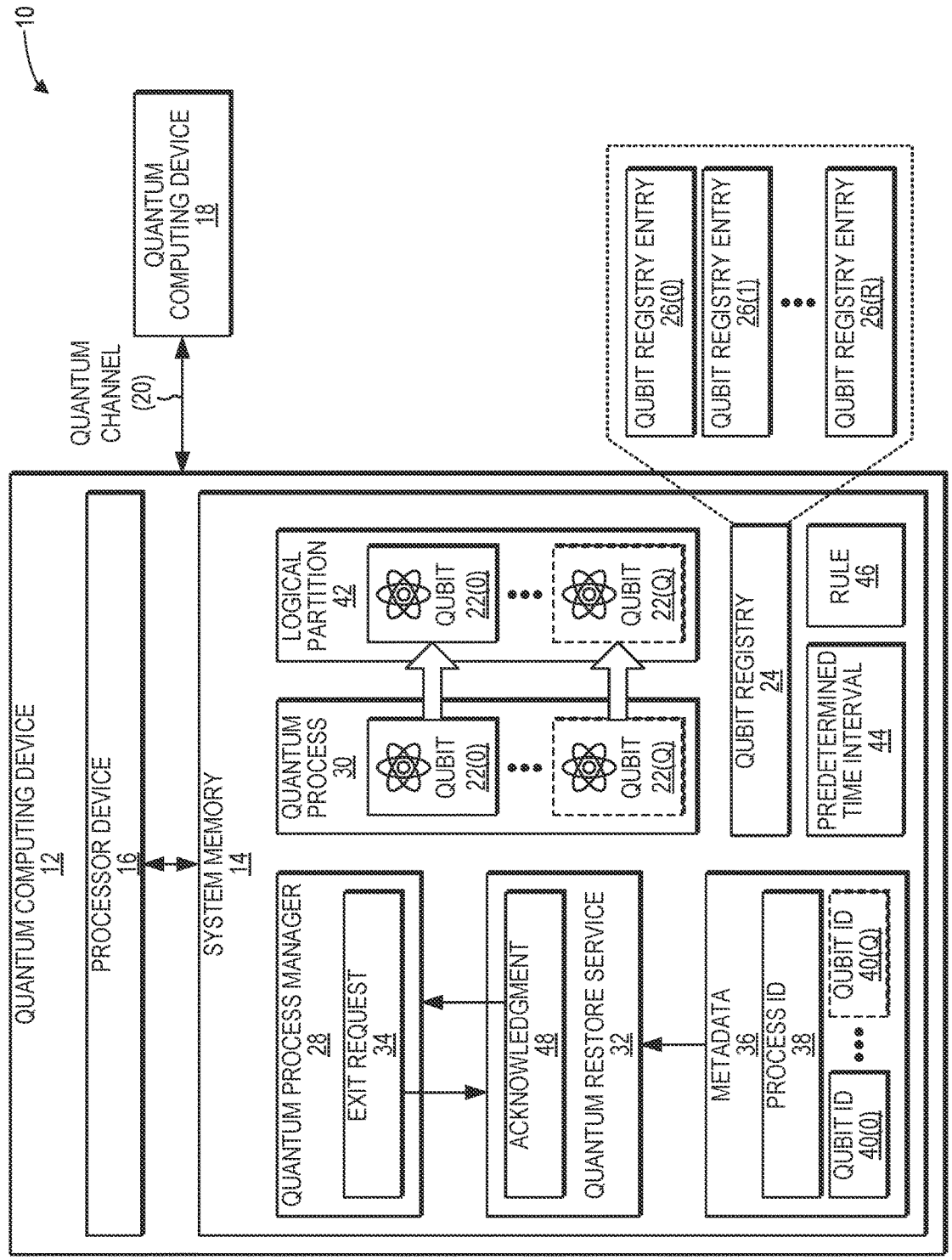
FIG. 1 is a block diagram of a quantum computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum process" and "second quantum process," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such as superposition and entanglement) that differ from those of non-quantum bits used in classical computing. As quantum computing continues to increase in popularity and become more commonplace, an ability to manage the use of qubits by quantum processes that may be subject to unexpected or accidental termination will be desirable.

The examples disclosed herein implement a quantum restoration mechanism that, upon detecting an exit request for a quantum process, maintains any qubits that are associated with that quantum process after the quantum process terminates. The term "quantum process" and derivatives thereof are used herein to refer to a process that executes on a quantum computing device, and that accesses one or more qubits to provide a desired functionality. To enable restoration of qubits following quantum process termination, a quantum restore service, executing on a processor device of a quantum computing device, first detects an exit request corresponding to a quantum process that is associated with one or more qubits. The quantum restore service obtains metadata, which includes an identification of the quantum process (such as, e.g., a quantum process identifier (ID), a quantum process name, and/or a Quantum Assembly Language (QASM) file descriptor, as non-limiting examples) and an identification of each qubit. The quantum restore service then maintains the qubits in association with the identification of the quantum process based on the metadata after termination of the quantum process. In some examples, the quantum restore service may maintain the qubits in association with the identification of the quantum process by allocating a logical partition, associating the logical partition with the identification of the quantum process, and then associating the qubits with the logical partition. By allocating a logical partition and associating the qubits with the logical partition, the quantum restore service may preserve the qubits after the quantum process has terminated.

The quantum restore service according to some examples may maintain the qubits until expiration of a predetermined time interval after termination of the quantum process. The predetermined time interval may be, e.g., defined by a rule. In some examples, if the quantum process is not restarted by the expiration of the predetermined time interval, the quantum restore service may release the qubits for reuse by other quantum processes. Some examples may provide that, if the quantum restore service detects that the quantum process is restarting, the quantum restore service may re-associate the qubits with the quantum process, which makes the qubits available for use again by the restarted quantum process. In some examples, the quantum restore service may transmit an acknowledgement (e.g., to a quantum process manager or to the restarted quantum process) to indicate that the qubits were re-associated with the quantum process.

FIG. 1 is a block diagram of a quantum computing system 10 according to one example. The quantum computing system 10 includes a quantum computing device 12 that comprises a system memory 14 and a processor device 16, and also includes a quantum computing device 18 that includes constituent elements similar to those of the quantum computing device 12 and provides functionality corresponding to the functionality attributed herein to the quantum computing device 12. It is to be understood that the quantum computing system 10 according to some examples may include other classical computing devices and/or additional quantum computing devices that are not illustrated in FIG. 1. Additionally, the quantum computing device 12 and the quantum computing device 18 in some examples may include constituent elements in addition to those illustrated in FIG. 1.

The quantum computing device 12 and the quantum computing device 18 in the example of FIG. 1 may be close in physical proximity to one another or may be relatively long distances from one another. The quantum computing device 12 and the quantum computing device 18 operate in quantum environments but can operate using classical computing principles or quantum computing principles. When using quantum computing principles, the quantum computing device 12 and the quantum computing device 18 perform computations that utilize quantum-mechanical phenomena, such as superposition and/or entanglement states. The quantum computing device 12 and the quantum computing device 18 each may operate under certain environmental conditions, such as at or near zero degrees (0°) Kelvin. When using classical computing principles, the quantum computing device 12 and the quantum computing device 18 utilize binary digits that have a value of either zero (0) or one (1). The quantum computing device 12 and the quantum computing device 18 may be communicatively coupled via a conventional communications link (not shown) and/or via a quantum channel 20 over which qubits may be transmitted.

In the example of FIG. 1, the quantum computing device 12 implements a set of one or more qubits 22(0)-22(Q). To maintain information for the qubit(s) 22(0)-22(Q), the quantum computing device 12 includes a qubit registry 24, which comprises a plurality of qubit registry entries 26(0)-26(R) each corresponding to a qubit such as the one or more qubits 22(0)-22(Q). The qubit registry 24 in some examples maintains data regarding the qubits implemented by the quantum computing device 12, such as a count of the total number of qubits implemented by the quantum computing device 12 and a count of the number of available qubits that are currently available for allocation, as non-limiting examples. Each of the qubit registry entries 26(0)-26(R) also stores qubit metadata (not shown) for a corresponding qubit. The qubit metadata may include, as non-limiting examples, an identifier of the corresponding qubit, an availability indicator that indicates whether the corresponding qubit is available for use or is in use by a specific quantum process, an identifier of a quantum process associated with the corresponding qubit, and/or an entanglement indicator that indicates whether the corresponding qubit is in an entangled state.

While the one or more qubits 22(0)-22(Q) are shown in FIG. 1 as all being implemented by the quantum computing device 12, it is to be understood that some examples may provide that the one or more qubits 22(0)-22(Q) may be distributed across multiple quantum computing devices. For instance, in some examples, some of the one or more qubits 22(0)-22(Q) may be implemented by the quantum computing device 12, while others of the one or more qubits 22(0)-22(Q) may be implemented by the quantum computing device 18. However, the principles of the operations disclosed herein for enabling restoration of qubits following quantum process termination remains the same in such examples.

To provide functionality for managing quantum processes, the quantum computing device 12 provides a quantum process manager 28. The quantum process manager 28 is responsible for managing the scheduling of quantum processes, which may include placing quantum processes in an active state to allow each quantum process to execute, or placing quantum processes in a blocked state to suspend execution of each quantum process. The quantum process manager 28 maintains quantum process metadata (not shown) that includes data for each quantum process executing on the quantum computing device 12. The quantum process metadata may include, as non-limiting examples, a unique a quantum process ID for a corresponding quantum process (i.e., a process identifier unique to a specific instance of a quantum process), a quantum process name of the quantum process (i.e., a name for the quantum process that remains the same over multiple instances), an internet protocol (IP) address associated with the quantum process, an identifier of qubits utilized by the quantum process, and/or a file descriptor and location of a QASM file that implements the quantum process.

In exemplary operation, at a point in time prior to that illustrated in FIG. 1, the quantum process manager 28 receives a request (not shown), from an operator or from a quantum application, to initiate a quantum process 30. The quantum process manager 28 causes an allocation of a memory space (not shown) for the quantum process 30, and initiates the quantum process 30 in the memory space via a QASM file (not shown). The quantum process manager 28 generates metadata for the quantum process 30, and may also analyze and parse the QASM file from which the quantum process 30 was initiated to determine the one or more qubits 22(0)-22(Q) that are utilized by the quantum process 30. The quantum process manager 28 then stores the metadata for the quantum process 30, and also causes qubit metadata in the qubit registry 24 corresponding to the one or more qubits 22(0)-22(Q) to be updated to indicate that the one or more qubits 22(0)-22(Q) are associated with the quantum process 30.

As part of managing quantum processes such as the quantum process 30, the quantum process manager 28 handles the scheduling and current state (e.g., active or blocked, as non-limiting examples) of the quantum process 30. In the course of conventional operation, it is possible that the quantum process 30 may be unexpectedly or accidentally terminated. In such cases, the one or more qubits 22(0)-22(Q) may be reallocated to other quantum processes, resulting in the loss of any data or quantum states of the one or more qubits 22(0)-22(Q) being used by the quantum process 30. Even if the one or more qubits 22(0)-22(Q) are not reallocated and the quantum process 30 is subsequently restarted, the previous data and quantum states of the one or more qubits 22(0)-22(Q) may be irretrievably lost.

Accordingly, examples disclosed herein provide mechanisms for enabling the one or more qubits 22(0)-22(Q) to be restored in the event of termination of the quantum process 30. In one example, a quantum restore service 32 is executed by the processor device 16 of the quantum computing device 12 to maintain the one or more qubits 22(0)-22(Q) in a recoverable state should the quantum process 30 be inadvertently or unexpectedly terminated. In exemplary operation, the quantum restore service 32 first detects an exit request 34 corresponding to the quantum process 30. In the example of FIG. 1, the quantum restore service 32 may detect the exit request 34 by receiving the exit request 34 from the quantum process manager 28 (which in turn may detect or receive an exit request from the quantum process 30). Some examples may provide that the quantum restore service 32 detects the exit request 34 by receiving the exit request from the quantum process 30.

The quantum restore service 32 next obtains metadata 36, which includes an identification 38 (captioned "PROCESS ID" in FIG. 1) of the quantum process 30, and also includes an identification 40(0)-40(Q) (captioned "QUBIT ID" in FIG. 1) of each of the one or more qubits 22(0)-22(Q). The identification 38 of the quantum process 30 may comprise, as non-limiting examples, a quantum process ID of the quantum process 30, a quantum process name of the quantum process 30, and/or a QASM file descriptor of the quantum process 30. The quantum restore service 32 may obtain the metadata 36 from one or more sources within the quantum computing device 12, including but not limited to the quantum process manager 28 and/or the qubit registry 24 and the qubit registry entries 26(0)-26(R) stored therein.

The quantum restore service 32 then maintains the one or more qubits 22(0)-22(Q) in association with the identification 38 of the quantum process 30 based on the metadata 36 after termination of the quantum process 30. The term "maintains" and derivatives thereof are used herein to mean that the quantum restore service 32 takes action to preserve a current state of the one or more qubits 22(0)-22(Q) and prevent the one or more qubits 22(0)-22(Q) from being reallocated to another quantum process after termination of the quantum process 30. For instance, some examples of the quantum restore service 32 may maintain the one or more qubits 22(0)-22(Q) by allocating a logical partition 42, associating the logical partition 42 with the identification 38 of the quantum process 30, and then associating the one or more qubits 22(0)-22(Q) with the logical partition 42 (e.g., by updating corresponding ones of the qubit registry entries 26(0)-26(R) of the qubit registry 24). Because the qubit registry 24 will then see the one or more qubits 22(0)-22(Q) as associated with the logical partition 42, the one or more qubits 22(0)-22(Q) will not be reallocated and reused by other quantum processes.

In some examples, the quantum restore service 32 may maintain the one or more qubits 22(0)-22(Q) until expiration of a predetermined time interval 44 after termination of the quantum process 30. Thus, for instance, a timer (not shown) may be started by the quantum restore service 32 upon termination of the quantum process 30, and may be allowed to run until the predetermined time interval 44 is reached. The predetermined time interval 44 according to some examples may be defined by a rule 46 (e.g., provided by a rules engine not shown in FIG. 1). In some such examples, if the quantum process 30 is not restarted by the expiration of the predetermined time interval 44, the quantum restore service 32 may release the one or more qubits 22(0)-22(Q) for reuse by other quantum processes (e.g., by updating corresponding ones of the qubit registry entries 26(0)-26(R) of the qubit registry 24 to indicate that the one or more qubits 22(0)-22(Q) are available for use).

Some examples may provide that the quantum restore service 32 may detect that the quantum process 30 is restarting (based on, e.g., an indication (not shown) received from the quantum process manager 28 upon startup of a new process). The quantum restore service 32 may then re-associate the one or more qubits 22(0)-22(Q) with the quantum process 30 (e.g., by updating corresponding ones of the qubit registry entries 26(0)-26(R) of the qubit registry 24). This would make the one or more qubits 22(0)-22(Q) available for use again by the restarted quantum process 30. In some examples, the quantum restore service 32 may also transmit an acknowledgement 48 (e.g., to the quantum process manager 28 as shown in FIG. 1, or to the quantum process 30 directly) to indicate that the one or more qubits 22(0)-22(R) were re-associated with the restarted quantum process 30. The quantum process manager 28 and/or the quantum process 30 may then assume that the previous state of the quantum process 30 has been restored, and may take appropriate programmatic steps if needed.

It is to be understood that, because the quantum restore service 32 is a component of the quantum computing device 12, functionality implemented by the quantum restore service 32 may be attributed to the quantum computing system 10 generally. Moreover, in examples where the quantum restore service 32 comprises software instructions that program the processor device 16 to carry out functionality discussed herein, functionality implemented by the quantum restore service 32 may be attributed herein to the processor device 16. It is to be further understood that while, for purposes of illustration only, the quantum restore service 32 is depicted as a single component, the functionality implemented by the quantum restore service 32 may be implemented in any number of components, and the examples discussed herein are not limited to any particular number of components.

Figure 2A:
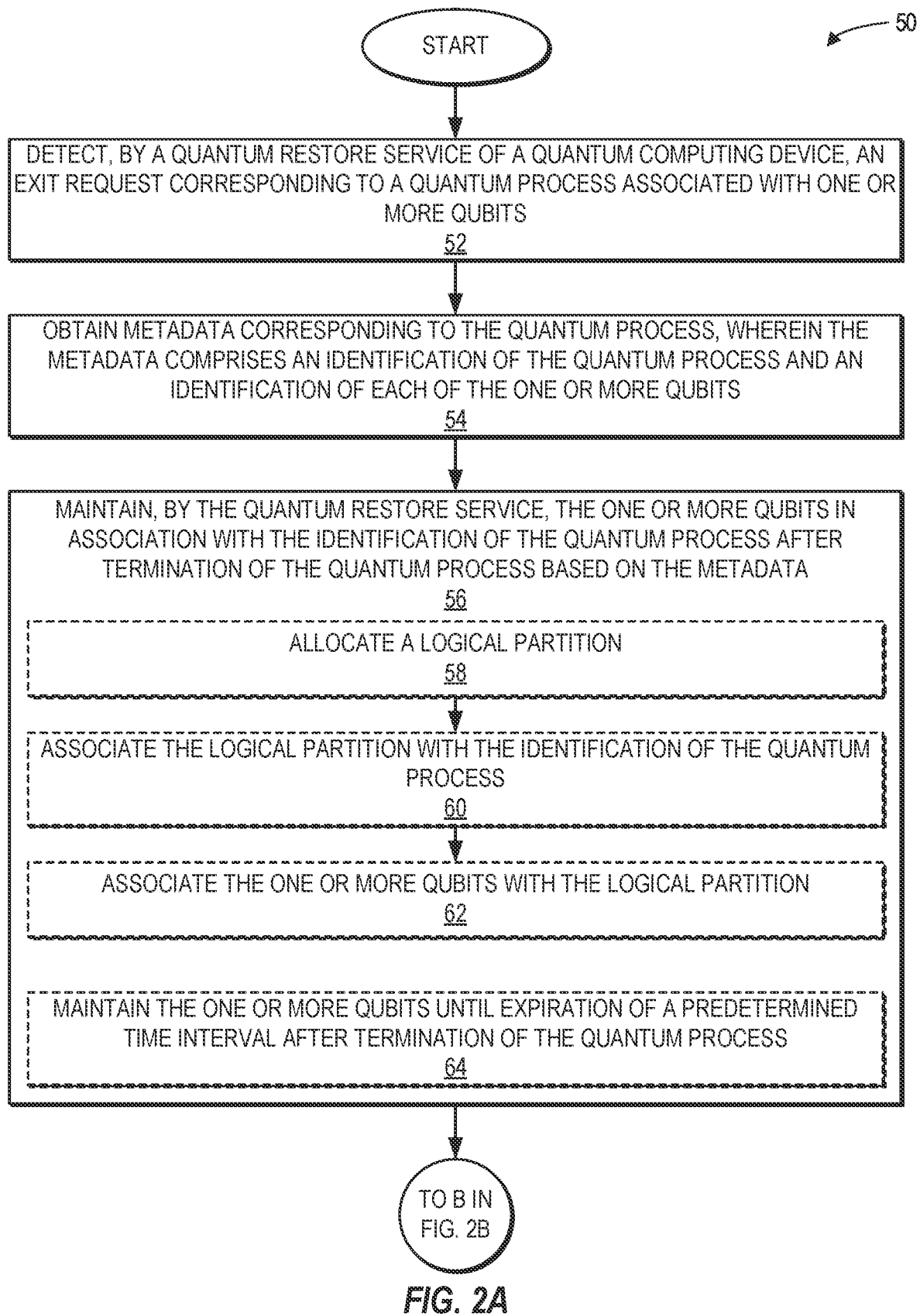
FIGS. 2A and 2B are flowcharts illustrating operations for enabling restoration of qubits following quantum process termination, according to one example.
Figure 2B:
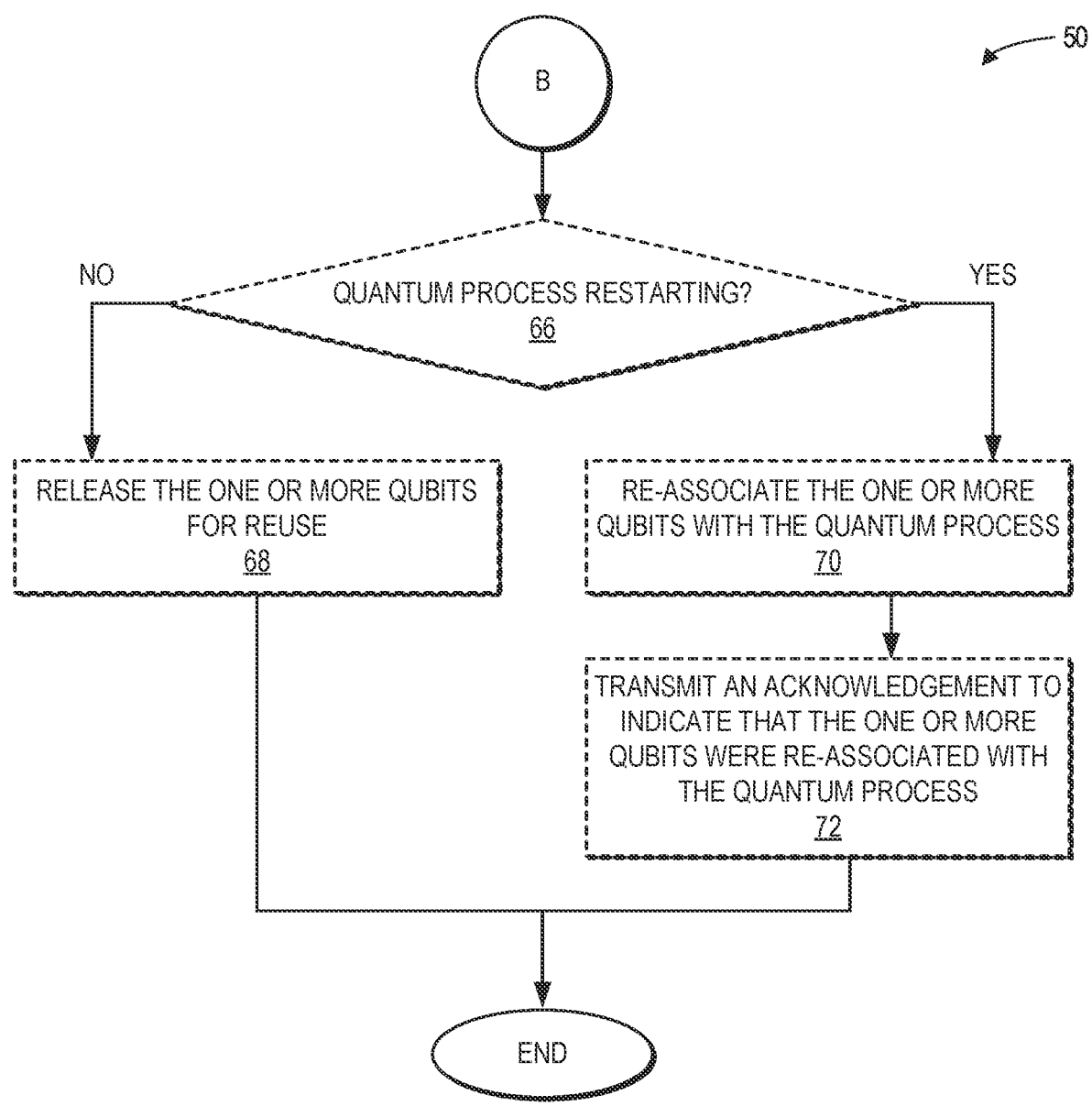

To illustrate exemplary operations of the quantum computing device 12 of FIG. 1 for enabling restoration of qubits following quantum process termination, FIGS. 2A and 2B provide a flowchart 50. Elements of FIG. 1 are referenced in describing FIGS. 2A and 2B for the sake of clarity. In FIG. 2A, operations begin with the processor device 16 of the quantum computing device 12 (e.g., by executing the quantum restore service 32) detecting the exit request 34 corresponding to the quantum process 30 associated with the one or more qubits 22(0)-22(Q) (block 52). The quantum restore service 32 next obtains the metadata 36 corresponding to the quantum process 30, wherein the metadata 36 comprises the identification 38 of the quantum process 30 and the identification 40(0)-40(Q) of each of the one or more qubits 22(0)-22(Q) (block 54). The quantum restore service 32 then maintains the one or more qubits 22(0)-22(Q) in association with the identification 38 of the quantum process 30 after termination of the quantum process 30 based on the metadata 36 (block 56).

In some examples, the operations of block 56 for maintaining the one or more qubits 22(0)-22(Q) in association with the identification 38 of the quantum process 30 after termination of the quantum process 30 based on the metadata 36 may comprise the quantum restore service 32 first allocating the logical partition 42 (block 58). The quantum restore service 32 may next associate the logical partition 42 with the identification 38 of the quantum process 30 (block 60). The quantum restore service 32 may then associate the one or more qubits 22(0)-22(Q) with the logical partition 42 (block 62). Some examples may provide that the quantum restore service 32 may maintain the one or more qubits 22(0)-22(Q) until expiration of the predetermined time interval 44 after termination of the quantum process 30 (block 64). Operations in some examples then continue at block 66 of FIG. 2B.

Turning now to FIG. 2B, the quantum restore service 32 according to some examples may determine whether the quantum process 30 is restarting (e.g., during the predetermined time interval 44) (block 66). If the quantum process 30 does not restart during the predetermined time interval 44, the quantum restore service 32 releases the one or more qubits 22(0)-22(Q) for reuse (block 68). However, if the quantum restore service 32 determines at decision block 66 that the quantum process 30 is restarting, the quantum restore service 32 re-associates the one or more qubits 22(0)-22(Q) with the quantum process 30 (block 70). In some examples, the quantum restore service 32 may also transmit the acknowledgement 48 to indicate that the one or more qubits 22(0)-22(Q) were re-associated with the quantum process 30 (block 72).

Figure 3:
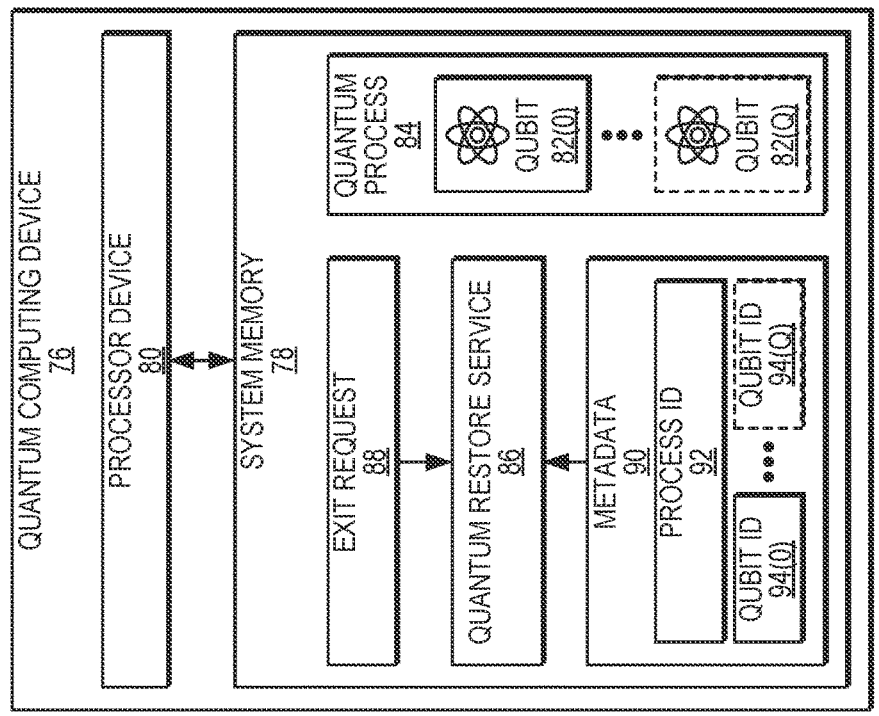
FIG. 3 is a simpler block diagram of the quantum computing device of FIG. 1 for enabling restoration of qubits following quantum process termination, according to one example.

FIG. 3 is a simpler block diagram of the quantum computing system 10 of FIG. 1 for enabling restoration of qubits following quantum process termination, according to one example. In the example of FIG. 3, the quantum computing system 74 includes a quantum computing device 76 that comprises a system memory 78 and a processor device 80. The quantum computing device 76 implements a set of one or more qubits 82(0)-82(Q), and initiates a quantum process 84. In exemplary operation, the processor device 80 executes a quantum restore service 86 first detects an exit request 88 corresponding to the quantum process 84. The quantum restore service 86 next obtains metadata 90, which includes an identification 92 (captioned "PROCESS ID" in FIG. 3) of the quantum process 84, and also includes an identification 94(0)-94(Q) (captioned "QUBIT ID" in FIG. 3) of each of the one or more qubits 82(0)-82(Q). The quantum restore service 86 then maintains the one or more qubits 82(0)-82(Q) in association with the identification 92 of the quantum process 84 based on the metadata 90 after termination of the quantum process 84.

Figure 4:
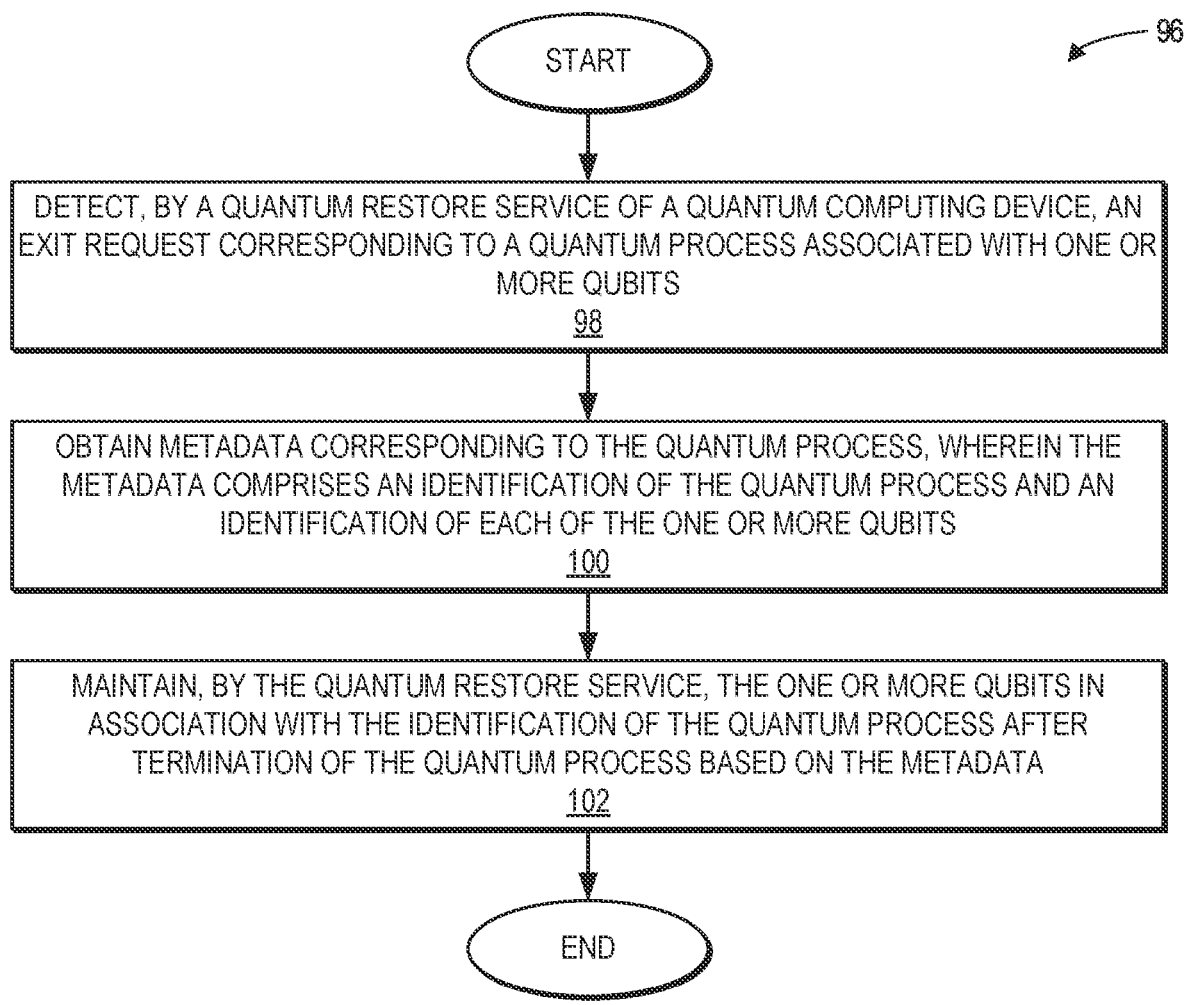
FIG. 4 is a flowchart of a simplified method for enabling restoration of qubits following quantum process termination in the quantum computing device of FIG. 3, according to one example.

FIG. 4 provides a flowchart 96 of a simplified method for enabling restoration of qubits following quantum process termination in the quantum computing system 74 of FIG. 3, according to one example. For the sake of clarity, elements of FIG. 3 are referenced in describing FIG. 4. In FIG. 4, operations begin with the processor device 80 of the quantum computing device 76 (e.g., by executing the quantum restore service 86) detecting the exit request 88 corresponding to the quantum process 84 associated with the one or more qubits 82(0)-82(Q) (block 98). The quantum restore service 86 next obtains the metadata 90 corresponding to the quantum process 84, wherein the metadata 90 comprises the identification 92 of the quantum process 84 and the identification 94(0)-94(Q) of each of the one or more qubits 82(0)-82(Q) (block 100). The quantum restore service 86 then maintains the one or more qubits 82(0)-82(Q) in association with the identification 92 of the quantum process 84 after termination of the quantum process 84 based on the metadata 90 (block 102).

Figure 5:
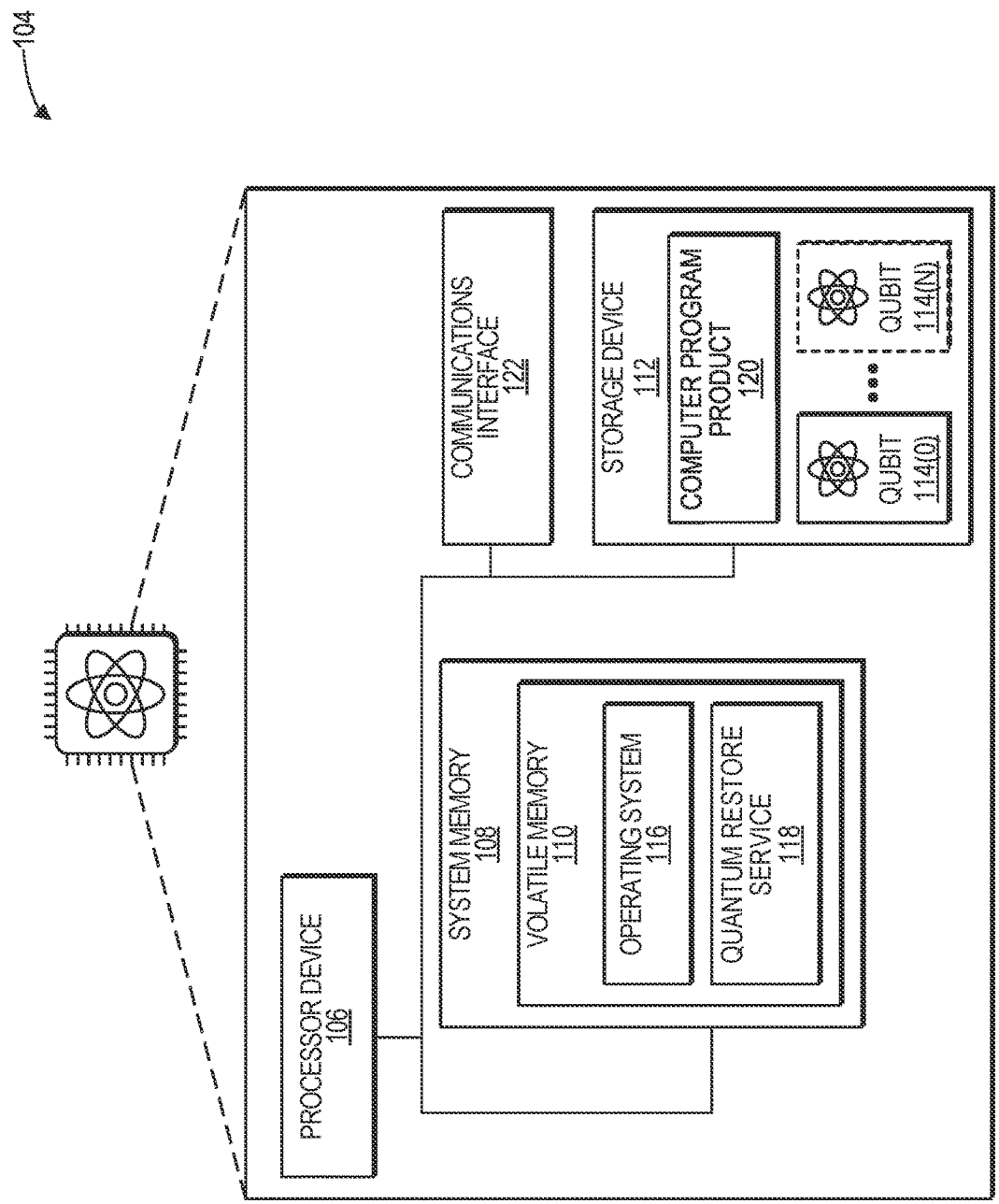
FIG. 5 is a block diagram of a quantum computing device suitable for implementing examples, according to one example.

FIG. 5 is a block diagram of a quantum computing device 104, such as the quantum computing device 12 and the quantum computing device 18 of FIG. 1, suitable for implementing examples according to one example. The quantum computing device 104 may comprise any suitable quantum computing device or devices. The quantum computing device 104 can operate using classical computing principles or quantum computing principles. When using quantum computing principles, the quantum computing device 104 performs computations that utilize quantum-mechanical phenomena, such as superposition and entanglement. The quantum computing device 104 may operate under certain environmental conditions, such as at or near zero degrees (0°) Kelvin. When using classical computing principles, the quantum computing device 104 utilizes binary digits that have a value of either zero (0) or one (1).

The quantum computing device 104 includes a processor device 106 and the system memory 108. The processor device 106 can be any commercially available or proprietary processor suitable for operating in a quantum environment. The system memory 108 may include volatile memory 110 (e.g., random-access memory (RAM)). The quantum computing device 104 may further include or be coupled to a non-transitory computer-readable storage medium such as a storage device 112. The storage device 112 and other drives associated with computer-readable media and computer-usable media may provide non-volatile storage of data, data structures, computer-executable instructions, and the like. The storage device may also provide functionality for storing one or more qubits 114(0)-114(N).

A number of modules can be stored in the storage device 112 and in the volatile memory 110, including an operating system 116 and one or more modules, such as a quantum restore service 118. All or a portion of the examples may be implemented as a computer program product 120 stored on a transitory or non-transitory computer-usable or computer-readable storage medium, such as the storage device 112, which includes complex programming instructions, such as complex computer-readable program code, to cause the processor device 106 to carry out the steps described herein. Thus, the computer-readable program code can comprise computer-executable instructions for implementing the functionality of the examples described herein when executed on the processor device 106.

An operator may also be able to enter one or more configuration commands through a keyboard (not illustrated), a pointing device such as a mouse (not illustrated), or a touch-sensitive surface such as a display device. The quantum computing device 104 may also include a communications interface 122 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method comprising:
   detecting, by a quantum restore service of a quantum computing device, an exit request corresponding to a quantum process associated with one or more qubits;
   obtaining metadata corresponding to the quantum process, wherein the metadata comprises an identification of the quantum process and an identification of each of the one or more qubits; and
   maintaining, by the quantum restore service, the one or more qubits in association with the identification of the quantum process based on the metadata after termination of the quantum process.

2. The method of claim 1, wherein the identification of the quantum process comprises one or more of a quantum process identifier (ID), a quantum process name, and a Quantum Assembly Language (QASM) file descriptor.

3. The method of claim 1, wherein maintaining the one or more qubits in association with the identification of the quantum process after termination of the quantum process comprises:
   allocating a logical partition;
   associating the logical partition with the identification of the quantum process; and
   associating the one or more qubits with the logical partition.

4. The method of claim 1, wherein maintaining the one or more qubits in association with the identification of the quantum process after termination of the quantum process comprises maintaining the one or more qubits until expiration of a predetermined time interval after termination of the quantum process.

5. The method of claim 4, wherein the predetermined time interval is defined by a rule.

6. The method of claim 4, further comprising, after the expiration of the predetermined time interval:
   determining that the quantum process has not restarted; and
   responsive to determining that the quantum process has not restarted, releasing the one or more qubits for reuse.

7. The method of claim 1, further comprising:
   determining that the quantum process is restarting; and
   responsive to determining that the quantum process is restarting, re-associating the one or more qubits with the quantum process.

8. The method of claim 7, further comprising transmitting an acknowledgement to indicate that the one or more qubits were re-associated with the quantum process.

9. A quantum computing device comprising:
   a system memory; and
   a processor device coupled to the system memory to:
      detect an exit request corresponding to a quantum process associated with one or more qubits;
      obtain metadata corresponding to the quantum process, wherein the metadata comprises an identification of the quantum process and an identification of each of the one or more qubits; and
      maintain the one or more qubits in association with the identification of the quantum process based on the metadata after termination of the quantum process.

10. The quantum computing device of claim 9, wherein the identification of the quantum process comprises one or more of a quantum process identifier (ID), a quantum process name, and a Quantum Assembly Language (QASM) file descriptor.

11. The quantum computing device of claim 9, wherein to maintain the one or more qubits in association with the identification of the quantum process after termination of the quantum process is to:
   allocate a logical partition;
   associate the logical partition with the identification of the quantum process; and
   associate the one or more qubits with the logical partition.

12. The quantum computing device of claim 9, wherein to maintain the one or more qubits in association with the identification of the quantum process after termination of the quantum process is to maintain the one or more qubits until expiration of a predetermined time interval after termination of the quantum process.

13. The quantum computing device of claim 12, wherein the predetermined time interval is defined by a rule.

14. The quantum computing device of claim 12, wherein the processor device is further to, after the expiration of the predetermined time interval:
   determine that the quantum process has not restarted; and
   responsive to determining that the quantum process has not restarted, release the one or more qubits for reuse.

15. The quantum computing device of claim 9, wherein the processor device is further to:
   determine that the quantum process is restarting; and
   responsive to determining that the quantum process is restarting, re-associate the one or more qubits with the quantum process.

16. The quantum computing device of claim 15, wherein the processor device is further to transmit an acknowledgement to indicate that the one or more qubits were re-associated with the quantum process.

17. A computer program product comprising a non-transitory computer-readable medium having stored thereon computer-executable instructions which, when executed, cause a processor device to:
   detect an exit request corresponding to a quantum process associated with one or more qubits;
   obtain metadata corresponding to the quantum process, wherein the metadata comprises an identification of the quantum process and an identification of each of the one or more qubits; and
   maintain the one or more qubits in association with the identification of the quantum process based on the metadata after termination of the quantum process.

18. The computer program product of claim 17, wherein to maintain the one or more qubits in association with the identification of the quantum process after termination of the quantum process is to:
- allocate a logical partition;
- associate the logical partition with the identification of the quantum process; and
- associate the one or more qubits with the logical partition.

19. The computer program product of claim 17, wherein:
- to maintain the one or more qubits in association with the identification of the quantum process after termination of the quantum process is to maintain the one or more qubits until expiration of a predetermined time interval after termination of the quantum process; and
- the computer-executable instructions further cause the processor device to, after the expiration of the predetermined time interval:
  - determine that the quantum process has not restarted; and
  - responsive to determining that the quantum process has not restarted, release the one or more qubits for reuse.

20. The computer program product of claim 17, the computer-executable instructions further cause the processor device to:
- determine that the quantum process is restarting; and
- responsive to determining that the quantum process is restarting, re-associate the one or more qubits with the quantum process.

* * * * *